July 2, 1968 C. B. SHEERIN 3,390,734
THROTTLE CONTROL LINKAGE FOR TILT CAB CONSTRUCTION
Filed Jan. 13, 1966 5 Sheets-Sheet 1

Inventor:
Cleo B. Sheerin
By Frederick J. Kube
Atty.

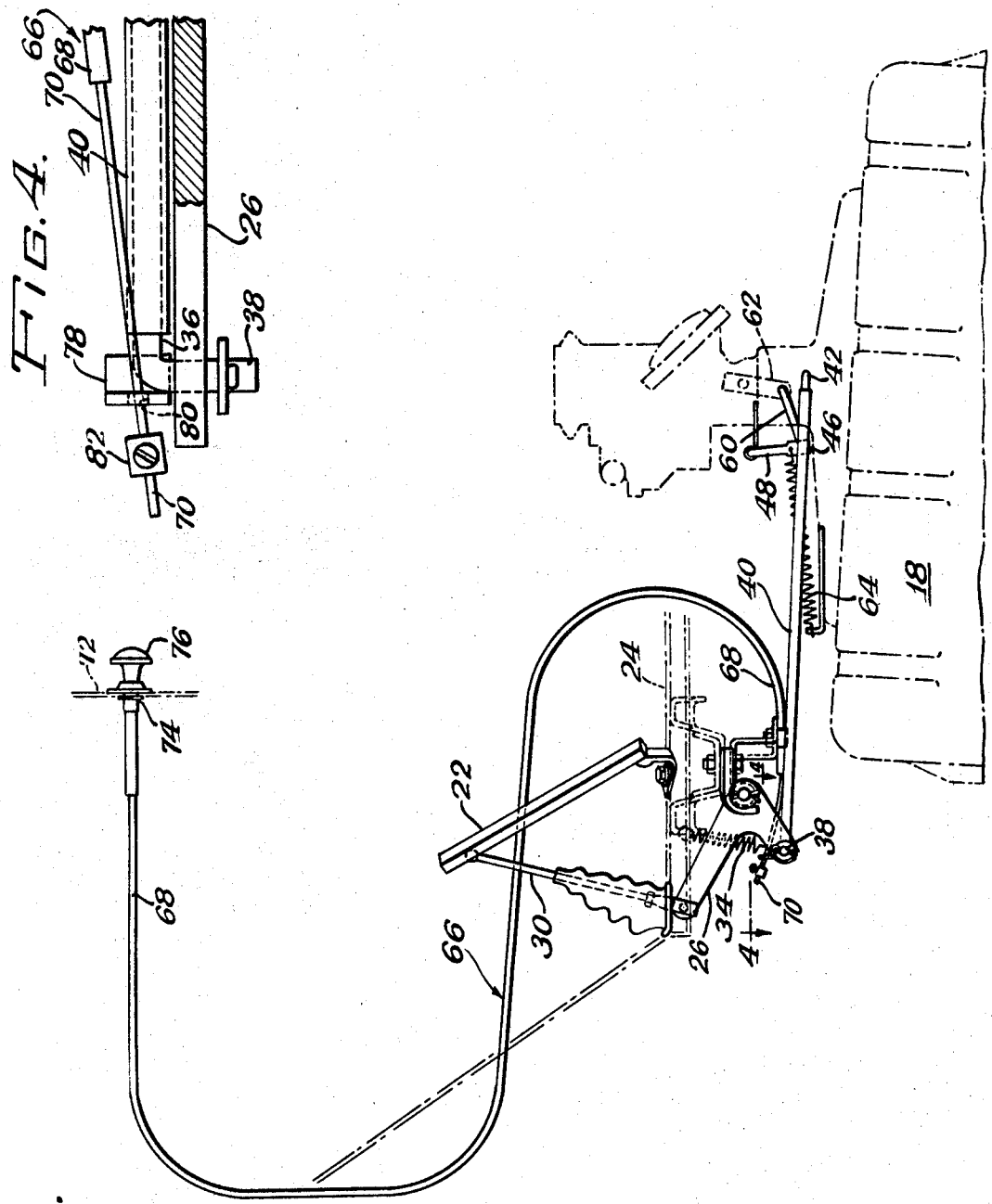

Inventor:
Cleo B. Sheerin

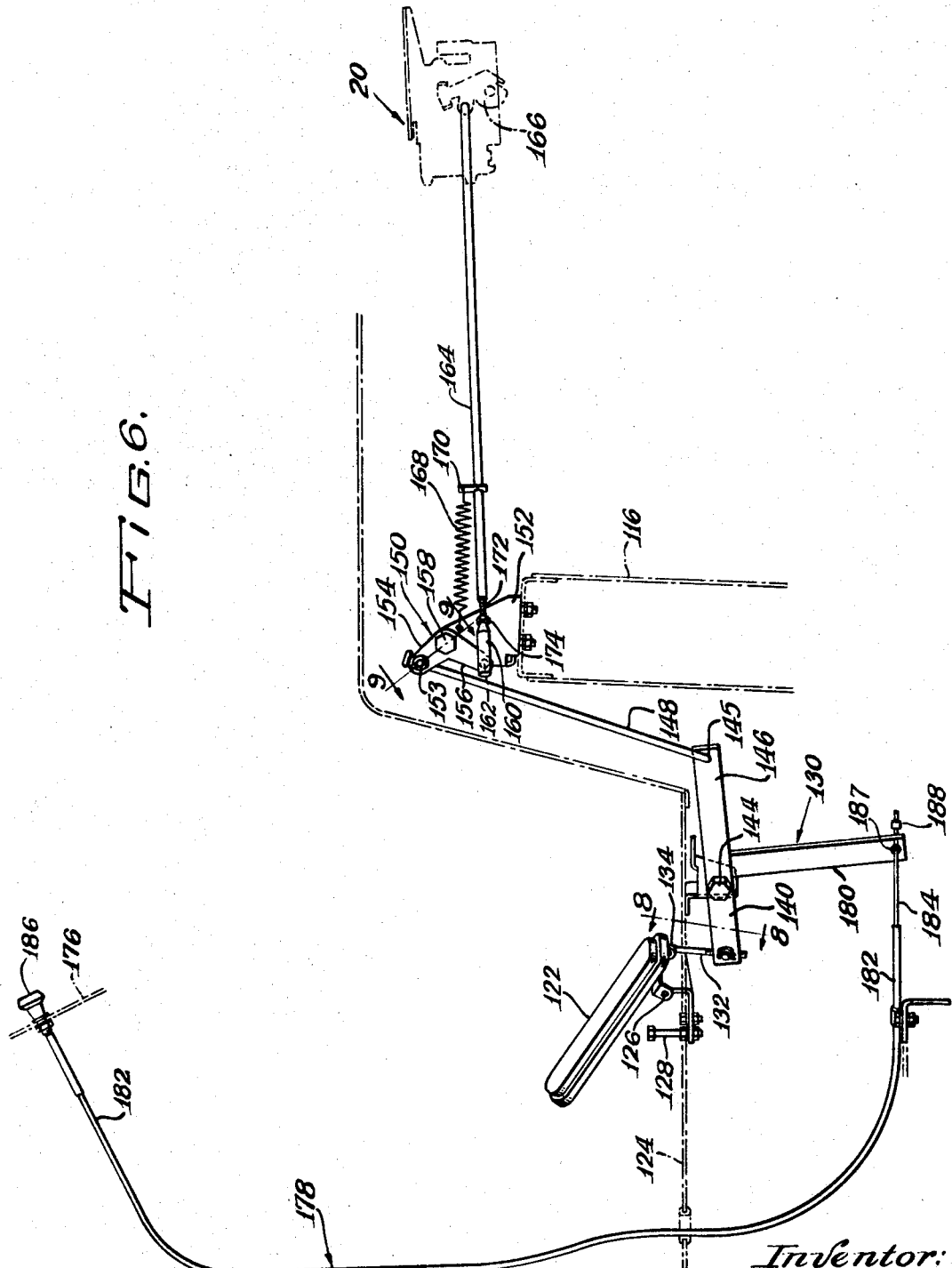

July 2, 1968  C. B. SHEERIN  3,390,734
THROTTLE CONTROL LINKAGE FOR TILT CAB CONSTRUCTION
Filed Jan. 13, 1966  5 Sheets-Sheet 5
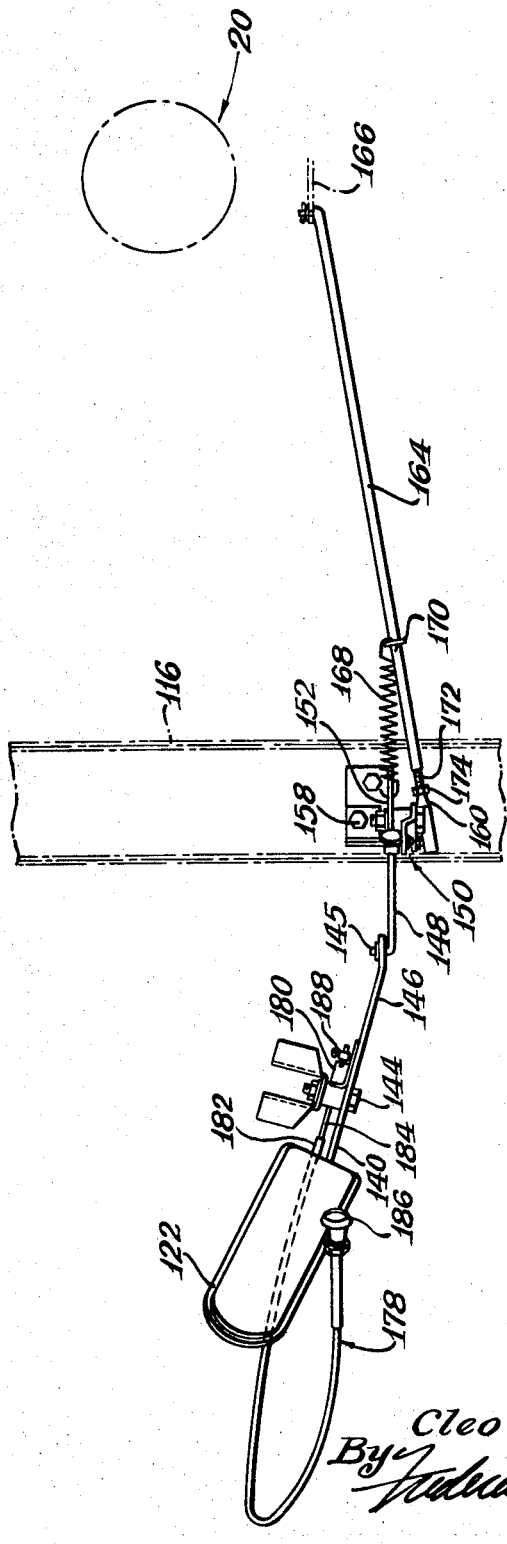
Inventor:
Cleo B. Sheerin

United States Patent Office 3,390,734
Patented July 2, 1968

3,390,734
THROTTLE CONTROL LINKAGE FOR TILT
CAB CONSTRUCTION
Cleo B. Sheerin, Fort Wayne, Ind., assignor to International Harvester Company, Chicago, Ill., a corporation of New Jersey
Filed Jan. 13, 1966, Ser. No. 520,478
10 Claims. (Cl. 180—77)

ABSTRACT OF THE DISCLOSURE

The throttle control assembly for a motor truck having a cab capable of swinging between a normally lowered, engine-enclosing position to a forwardly tilted, raised position so as to afford convenient access to certain vehicle components for making repairs and performing routine maintenance operations. The throttle control assembly includes a foot pedal mounted on the vehicle cab structure in such a manner so as to be swingable in unison with the cab as it is moved between its normally lowered and forwardly tilted, raised positions and is independently pivotal with respect to the cab to actuate a speed controlling throttle plate of the engine mounted on the vehicle chassis frame and stationary with respect to the vehicle cab during its tilting movement. The throttle control assembly operatively interconnecting the foot pedal and the engine throttle plate includes linkage means comprising a telescoping member whereby relative movement of the cab and foot pedal in unison during tilting of the vehicle cab with respect to the chassis frame and engine throttle plate is readily accommodated without the necessity of physically disconnecting the linkage means in any way.

---

The present invention relates generally to throttle control linkages for motor vehicles having a tilt cab, and more particularly to such linkages which do not require any adjustment or disconnection to permit tilting of the cab.

Tilt cabs have been often utilized in the past as a means of providing easy access to certain vehicle components for making repairs and performing routine maintenance. Since the need for such service tasks occur frequently, it is desirable that the operation of tilting the cab from its normally lowered position to its raised position be performed quickly and with a minimum of effort. The tilting operation is complicated, however, by the fact that the cab, which comprises a noperator's compartment, is provided with various controls, i.e. control means for the steering, brake, clutch and engine throttle, while the operational components controlled thereby are affixed to the stationary or non-tiltable portion of the vehicle. Hence the tilting operation itself causes a change in the distancebetween the operator's control element, located in the tilt cab, and the controlled element located in the non-tiltable vehicle portion. Obviously, one solution to this problem would be to manually disconnect the control means from the control component prior to tilting and to reconnect them when the cab is returned to its normal lowered position. The disadvantages of this approach are apparent. Two other approaches utilized in the prior art to solve the problem of compensating for distance changes upon tilting, while avoiding the necessity of disconnection, are to either provide a flexible connection between the control element and the controlled component, such as a Bowden wire, which is capable of spanning the increased distance with the cab in its raised position, or to locate one of the pivot axes within the control linkage so that it is coaxial with the pivot axis of the tilt cab. The former of these solutions creates additional problems due to the fact that the flexible connection is excessively long when the cab is in its lowered position presenting an unsightly appearance, if allowed to be exposed, and often causing malfunction of other controls or components, if an attempt is made to conceal it, due to the fact that the flexible connection bends with little predictability, and may contact electrical connections or become entangled with other linkages. The latter solution also presents problems and possesses certain disadvantages in that it becomes difficult to locate all of those control linkages, which would otherwise require disconnection, with a pivot axis on that axis defined by the cab pivots. Conventionally, all linkages would be positioned between the cab pivots and with the space therebetween thus limited, the problem then arises of how the steering, brake, clutch, and engine control linkages can all be located with one pivot on the cab pivot axis, providing the linkage pivots with proper bearing support and with sufficient spacing between them so that in all linkage positions there is no interference. While in most applications such requirements can be fulfilled, there is almost always a need for a very complicated linkage system on at least one of the controls simply to reach a location along the cab pivot axis where sufficient space is available to permit an adequate mounting. In addition, the alignment of the pivot axes for the control linkages with the cab pivot is critical in order to prevent binding and preclude any movement of the linkage other than pure rotation. Where mass production is demanded, such critical alignments are desirably held to a minimum.

It is, therefore, an object of the present invention to provide a throttle control linkage for a vehicle having a tilt cab which will permit tilting thereof without the need for any adjustment or disconnection prior thereto, which does not require any critical alignment with other pivot axes, and which is positive and predictable in its movement.

It is also an object of the present invention to provide such a throttle control linkage which is simple and inexpensive to manufacture and maintain.

These and other objects and many of the attendant advantages will become more readily apparent from a perusal of the following description and the accompanying drawings, wherein:

FIGURE 3 is a side elevational view of the control linkage shown in FIGURE 1;

FIGURE 4 is a horizontal sectional view taken substantially on the line 4—4 of FIGURE 3;

FIGURE 6 is a side elevational view of a second embodiment of the engine control linkage;

FIGURE 7 is a plan view of the engine control linkage shown in FIGURE 6;

Figure 1:
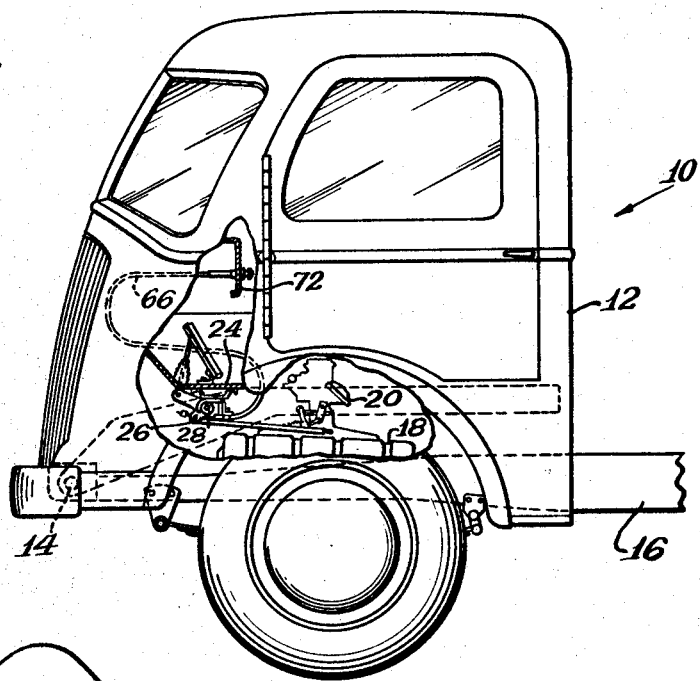
FIGURE 1 is a side elevational view of a fragmentary portion of a vehicle having a tilt cab embodying one form of the improved throttle controlled linkage.
Figure 2:
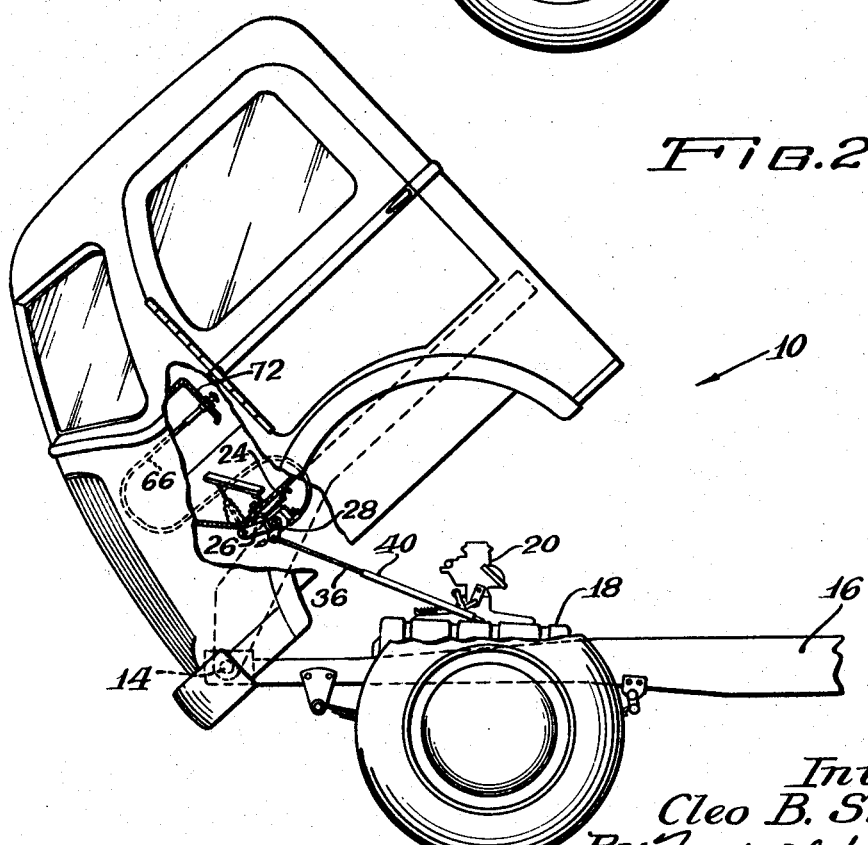
FIGURE 2 is a view of the vehicle similar to FIGURE 1 but showing the cab in a tilted position.
Figure 5:
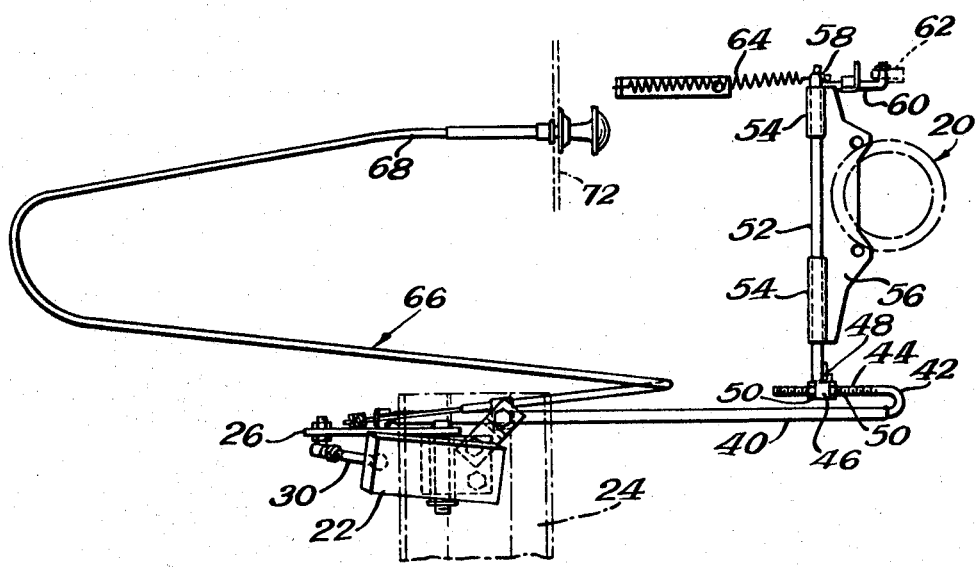
FIGURE 5 is a plan view of the throttle control linkage shown in FIGURE 3.

Referring now in detail to the drawings, there is shown in FIGURES 1 and 2 the forward portion of a vehicle indicated generally at 10, having a cab 12 pivotally mounted at 14 to the vehicle frame 16. An engine 18 having a carburetor 20 is mounted on the frame 16 rearwardly of the pivot point 14. A bell crank 26 is rotatably affixed at 28 to the underneath side of the floor 24 of the cab. As best shown in FIGURE 3, a pedal 22 is carried on the upper side of the floor 24 and is capable of being depressed by pressure exerted by the operator's foot. A link 30 is pivotally connected at 32 to the longer arm of the bell crank 26 and extends through on opening the floor 24 into engagement with the pedal 22. A spring 34 is connected between the bell crank 26 and the floor 24. Depression of the pedal 22 results in counterclockwise rotation of the bell crank 26 against the bias of the spring 34. A rod 36 is provided with an angled portion 38, as shown in FIGURE 4, which extends through an opening in the shorter arm of the bell crank 26 to form a pivotal connection therewith. A hollow tube 40, having a length slightly longer than the rod 36, is slidably carried on the rod 36. A basically U-shaped rod 42, as shown in FIGURE 5 has one of its legs rigidly secured to the end of the tube 40 opposite the angle portion 38 of the rod 36. The other leg of the U-shaped rod 42 is threaded at 44 and slidably received by a sleeve 46, which is pivotally attached to a crank arm 48. A pair of nuts 50, engageable with the threaded portion 44, are positioned on each side of the sleeve 46. The crank arm 48 is formed as an extension on one end of a shaft 52 rotatably mounted in bearings 54, which are secured to the carburetor 20 by a plate 56. A second crank arm 58 is formed on the other end of the shaft 52 and is connected through link 60 to a lever 62 for positioning the throttle plate, not shown, within the carburetor 20. A tension spring 64 is connected between the engine 18 and the end of the crank arm 58, and biases the throttle plate toward its idle position.

A hand control for the throttle is also provided within the operator's compartment defined by the cab 12. A Bowden wire 66 having an outer sheath 68 and a cable 70 slidable within the sheath 68 extends between the instrument panel 72 and the bell crank 26. The sheath 68 is firmly secured to the instrument panel 72 by fastening means 74 and the cable 70 is attached to a control handle 76. The other end of the sheath 68 is stripped back so that the cable 70 is exposed and extends a few inches beyond the end of the sheath 68. As best seen in FIGURE 4, a small angle bracket 78 is affixed to the rod 36 and is provided with a small opening 80 through which the cable 70 extends. A set screw clamp 82 is adjustably secured to the free end of the cable 70.

Depression of the foot pedal 22 will cause the link 30 to rotate the bell crank 26 in a counterclockwise direction, such rotation in turn causing the rod 36 to slide interiorly of the hollow tube 40. When the rod 36 has reached its point of deepest penetration, as determined by contact between the hollow tube and the angle bracket 78 secured to the rod 36, any further rotation of the bell crank will cause the hollow tube 40 to move as a unit with the rod 36. Movement of the tube and rod to the right will result in the throttle being displaced from its idle position. When pressure is released from the pedal 22, the spring 34 will return the pedal, the link 30, the bell crank 26 and the rod 36 to the position shown in FIGURE 3. At the same time the spring 64 will return the throttle, the lever 62, the link 60, the crank arm 58, the shaft 52, the crank arm 48, the U-shaped rod 42 and the hollow tube 40 to its normal idle position. Similarly, when a tension force is applied to the control knob 76, the exposed portion of the cable 70 will be drawn into the sheath 68 causing the set screw clamp 82 to contact the angle bracket 78 and rotate the bell crank in a counterclockwise direction. The operation of the associated linkage connected to the shorter arm of the bell crank 26 will be the same whether the hand control 76 or the foot pedal 22 is utilized to actuate the throttle. The arrangement of the sleeve 46 with a nut 50 on either side thereof permits adjustable positioning of the hollow tube 40 relative to the bracket 78 and thereby determines the amount of slack that must be taken up by rotation of the bell crank 26 before actuation of the throttle begins. When the cab is tilted to the position shown in FIGURE 2, the bell crank 26 and the rod 36 which are affixed to the cab 12 will be rotated therewith about the pivot point 14. As the distance between the carburetor and the bell crank increases during the tilting operation, the rod 36 will be extracted from the hollow tube 40. The pivotal connection at 38 and the pivotal mounting of the sleeve 46 on the crank arm 48 will permit the rod 36 and the hollow tube 40 to align themselves and thereby prevent binding as the rod 36 is extracted from the tube 40. The links of the rod 36 and the tube 40 are sufficient in length so that the rod 36 is never completely extracted from the hollow tube 40, and as the cab 12 is repositioned in its normally lowered position, the rod 36 will telescope with the tube 40.

Figure 8:
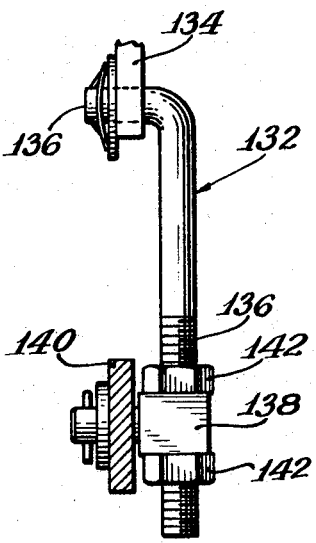
FIGURE 8 is a transverse sectional view taken substantially on line 8—8 of FIGURE 6.
Figure 9:
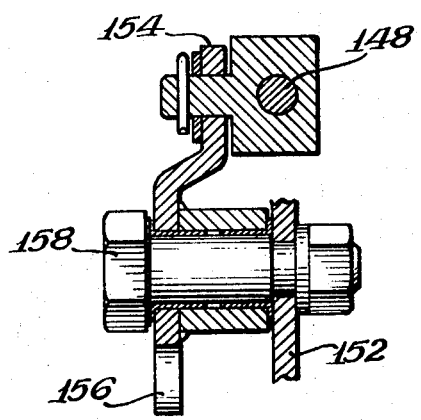
FIGURE 9 is a transverse sectional view taken substantially on line 9—9 of FIGURE 6.

In the embodiment shown in FIGURES 6 and 7, a foot pedal 122 is pivotally mounted at 126 to the floor 124 of the cab. A stop means is also provided at 128 to limit the travel of the pedal 122. The pedal 122 is connected to a T-shaped crank, indicated generally at 130, by means of a link 132, as shown in detail in FIGURE 8. An angle portion 136 is pivotally secured to a tab 134 formed on the rearward portion of the pedal 122. The other end of the link 132 is threaded at 136 and slidably receives a sleeve 138 which is pivotally attached to one arm 140 of the T-crank 130. A pair of lock nuts 142 positioned on either side of the sleeve 138 adjustably secured the sleeve 138 to the link 132. The T-crank 130 is pivotally mounted at 144 to the underside of the floor 124. A second arm of the T-crank 146 is pivotally attached at 145 to a connecting link 148. The other end of the connecting link 148 is pivotally attached by pivot pin 153 to a bell crank 150 which is rotatably mounted by means of pivot pin 158 on a bracket 152 attached to a frame member 116 of the vehicle. As best shown in FIGURE 9, the upper arm or extension 154 of the bell crank 150 is offset axially relative to the pivot pin 158 so that the upper arm 154 and the lower arm or extension 156 of the bell crank 150 lie in different planes. This offset is necessary to preclude interference when the cab is tilted as will be more fully explained hereinafter. A rod 160 is pivotally attached at 162 to the lower arm 156 of the bell crank 150 and is slidably received within a hollow tube 164. The hollow tube 164 is pivotally attached to a lever 166 for actuation of the throttle plate, not shown, within the carburetor 20. A spring 168 is secured beween the bracket 152 and a tab 170 secured to the hollow tube 164. A threaded portion 172 is provided on the rod 160 and an adjustment nut 174 engageable therewith provides means for adjusting the amount of rotation of the bell crank 150 prior to actuation of the throttle lever 166. A hand control for actuation of the throttle is also provided by a Bowden wire 178 which extends between the instrument panel 176 within the cab of the vehicle and the third arm 180 of the T-crank 130. In a conventional manner, the outer sheath 182 of the Bowden wire 178 is secured to the instrument panel 176 and the inner cable is attached to a control knob 186. As explained in connection with the embodiments of FIGURES 1 through 5, the inner cable 184 extends a short distance beyond the end of the sheath 182 and is slidably received through an opening 187 formed in the arm 180. A set screw clamp 188 is attached to the free end of the cable 184 and is engageable with the arm 180 to rotate the T-crank 130 in a clockwise direction when the control knob 186 is pulled outwardly from the instrument panel 176.

In this embodiment the T-crank 130 is affixed to the tiltable cab portion while the bell crank 150 is affixed to the stationary or nontiltable portion of the vehicle. It should also be noted that the bell crank 150 is positioned above the T-crank 130. Thus during the initial movement of the cab from its normally lowered position to its raised position, the distance between the T-crank 130 and the bell crank 150 decreases. The rigid connecting link 148 will therefore rotate the bell crank 150 in a clockwise direction resulting in the rod 160 being extracted from the hollow tube 164. As this clockwise rotation of the bell crank 150 takes place, the rod 160 must cross the connecting link 148 and hence it is necessary that these two elements be positioned in different planes. The offset in the upper arm 154, as shown in FIGURE 9 assures the necessary spacial arrangement. In order that the throttle may be freely operable with the cab in its raised position, it is necessary that the center line of the upper arm 154, as determined by the center of pivot 153 and pivot pin 158 with the cab in its normally lowered position and the throttle in idle position, be in axial alignment with the link 148 when the cab is in its raised poston. In other words, while some counterclockwise rotation of the bell crank 150 is necessary as the distance between the T-crank and the bell crank begins to increase after first decreasing, it is not desirable to have such counterclockwise rotation occur to the extent that the bell crank 150 has moved beyond, in a counterclockwise direction, its attitude when the cab is lowered and the throttle is idling. Such a relationship can be assured if a line through the centers of pivots 153 and 158, when the bell crank 150 is in normal position, passes through the pivotal connection 145 when in its raised position.

While two embodiments of the invention have been illustrated, it is understood that various changes may be made therein without departing from the scope of the invention as defined by the appended claims.

What is claimed is:

1. A throttle control device for a vehicle having a frame, an engine mounted on said frame, and a cab pivotally carried by said frame and tiltable between a lowered position adjacent said engine and a raised position remote therefrom, said engine including a throttle plate movable into and out of an idle attitude, comprising;
    a pedal mounted on said cab for independent pivotal movement between a raised position and a depressed position about an axis fixed with respect to said cab whereby said pedal and cab are constrained to move in unison,
    spring means biasing said throttle plate into said attitude, and
    linkage means connected between said pedal and said throttle plate and having a portion thereof mounted on said cab whereby pivoting of the said pedal from said raised position toward said depressed position rotates said plate out of said attitude against the bias of said spring means when said cab is in its lowered position,
    said linkage means accommodating tilting movement of said cab and pedal between the lowered and raised positions of said cab without physically disconnecting,
    said linkage means including a telescoping member which is collapsed when the cab is in its lowered position and extended when the cab is in its raised position.

2. A throttle control device according to claim 1 wherein said cab includes an instrument panel and further comprising:
    a Bowden wire having an outer sheath and an inner cable extending between said instrument panel and said linkage means,
    said sheath being secured to said panel and said cable being operatively attached to said portion of said linkage means which is mounted on said cab,
    the attachment of said cable to said linkage means being such that extraction of said cable from said sheath at the instrument panel provides essentially the same movement of said linkage means as depression of said pedal does.

3. A throttle control device according to claim 1 wherein said linkage means includes:
    a bell crank having a pair of arms rotatably mounted on said cab,
    a link connected between one of said arms and said pedal for rotating said crank in response to depression of said pedal,
    said telescoping member being pivotally attached at at one end to the other of said arm,
    and means pivotally securing the other end of the remaining portion of said linkage means to said throttle plate,
    whereby said telescoping member can freely elongate and collapse as the cab is respectively raised and lowered.

4. A throttle control linkage according to claim 3 and further comprising a Bowden wire having an outer sheath and an inner cable,
    said sheath being secured to the cab and said cable being affixed to said other arm, whereby extension of said cable from within the cab provides the same movement of said bell crank as depression of said pedal.

5. A throttle control device according to claim 1 wherein said linkage means includes:
    a crank means having a pair of arms pivotally secured to said cab;
    connection means operatively securing said pedal to one of said arms for rotation of said crank means in response to depression of said pedal;
    a bell crank rotatably mounted on said frame at a point above and rearward of the pivotal connection of said crank means to said cab;
    a link pivotally secured to the other arm of said crank means and to said bell crank; and
    said telescoping member connected between said bell crank and said throttle plate.

6. A throttle control device according to claim 5 wherein said bell crank comprises:
    a pair of extensions which are offset axially relative to the rotatable mounting of said bell crank on said cab;
    said link being pivotally attached to one of said extensions and said telescoping member being pivotally affixed to the other of said extensions; and
    said link when the cab is raised being substantially in axial alignment with a line determined by the center of the pivotal attachment of said link to said one extension and the center of said rotatable mounting of said bell crank when sad cab is lowered and said thrott!e plate is in said idle attitude.

7. A throttle control device according to claim 5 wherein:
    said crank means includes a third arm, and
    a Bowden wire having an outer sheath, and
    an inner cable is operatively connected between said third arm and said cab,
    said sheath being affixed to the interior of said cab, and
    said cable being operatively connected to said third arm,
    whereby extension of said cable relative to said sheath from within said cab will actuate said throttle plate in the same manner as depression of said pedal.

8. A throttle control device according to claim 1 wherein said telescoping member comprises a hollow tube, and
    a rod slidably received within said tube, and
    further comprising adjustable means on one end of said tube and rod for limiting the depth of penetration of said rod in said tube.

9. A throttle control device according to claim 8 wherein said adjustment means comprises,
    a threaded portion on said rod adjacent the free end of said tube and a nut in threaded engagement with said portion.

10. A throttle control device according to claim 8 wherein:

said rod is provided with an angled portion engageable with the free end of said tube, and said adjustment means comprises a V-shaped member having a threaded portion secured to the other end of said tube,
a sleeve slidably carried on said threaded portion.

References Cited

UNITED STATES PATENTS 2,141,267 12/1938 Dillon _____ 180—77
3,051,259 8/1962 Lorenz _____ 180—89

A. HARRY LEVY, *Primary Examiner.*